United States Patent
Aigner et al.

[11] Patent Number: 5,960,611
[45] Date of Patent: Oct. 5, 1999

[54] PROCESS FOR FOLDING AN AIRBAG FOR A PASSENGER RESTRAINT SYSTEM

[75] Inventors: Joachim Aigner, Landshut; Peter Bramberger, Welshofen; Bernhard Hermann, Germering; Martin Thorbjörnsson, München, all of Germany; Thomas Andersson, Vargarda, Sweden

[73] Assignee: Autoliv Development AB, Vargarda, Sweden

[21] Appl. No.: 08/952,361

[22] PCT Filed: May 3, 1996

[86] PCT No.: PCT/SE96/00579

§ 371 Date: Jan. 5, 1998

§ 102(e) Date: Jan. 5, 1998

[87] PCT Pub. No.: WO96/34781

PCT Pub. Date: Nov. 7, 1996

[30] Foreign Application Priority Data

May 5, 1995 [DE] Germany ............ 195 16 494
May 3, 1996 [SE] Sweden ............ PCT/SE96/00579

[51] Int. Cl.⁶ ............................................. B65B 63/04
[52] U.S. Cl. .......................... 53/429; 493/405; 493/451
[58] Field of Search ................................. 53/116, 117, 120, 53/429; 493/244, 405, 451, 940

[56] References Cited

U.S. PATENT DOCUMENTS

| | | |
|---|---|---|
| 3,839,947 | 10/1974 | Korhas et al. . |
| 4,235,453 | 11/1980 | Lawson et al. . |
| 4,351,544 | 9/1982 | Ross . |
| 5,162,035 | 11/1992 | Baker . |
| 5,300,011 | 4/1994 | Budde et al. . |
| 5,360,387 | 11/1994 | Baker . |
| 5,690,358 | 11/1997 | Marotzke . |
| 5,795,284 | 8/1998 | Berti . |
| 5,800,328 | 9/1998 | Berti . |
| 5,803,892 | 9/1998 | Marotzke . |

FOREIGN PATENT DOCUMENTS

| | | |
|---|---|---|
| 0443485 | 8/1991 | European Pat. Off. . |
| 4343026 | 6/1994 | Germany . |
| 4422276 | 12/1994 | Germany . |

*Primary Examiner*—Daniel B. Moon
*Attorney, Agent, or Firm*—Robert W. Becker & Associates

[57] ABSTRACT

A method for packing an inflatable airbag of a passenger restraint system of a motor vehicle into a housing, wherein the airbag includes a fabric envelope stored in a housing when not in use and is automatically inflated by a gas generator into a form of use when activated, includes the steps of firstly bringing the airbag into the form of use and secondly contacting the airbag in the form of use by mechanical folding aids and pushing the mechanical folding aids into the airbag. At least one first fold is formed so as to be arranged in a single fabric layer on the gas generator so that gas, produced by the gas generator for inflating the airbag when activated, directly impacts on the single fabric layer of the at least one first fold without flowing along other fold surfaces.

18 Claims, 9 Drawing Sheets

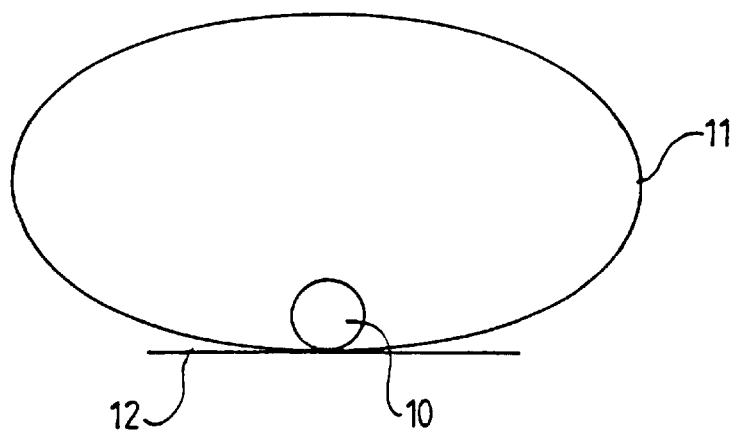
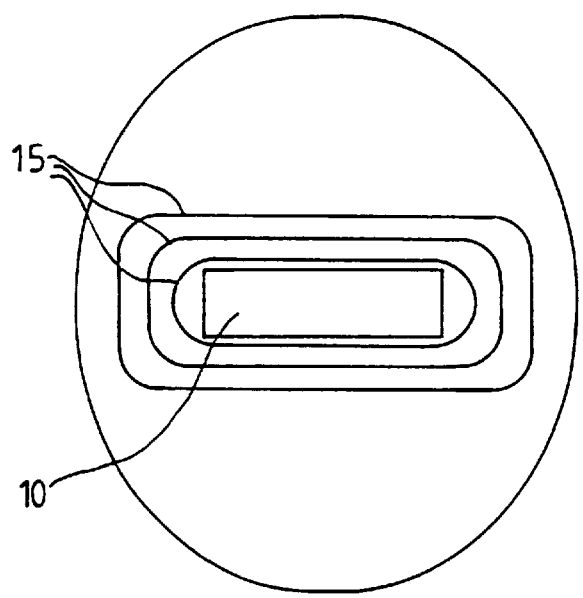
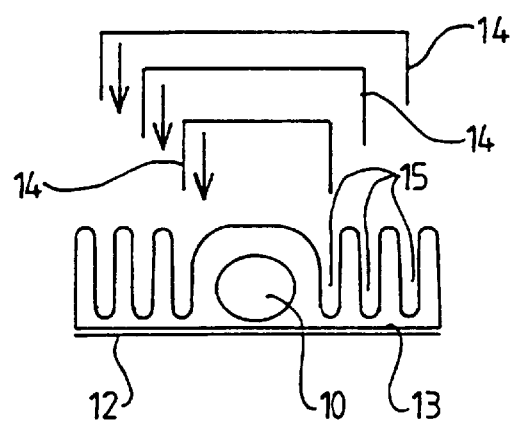

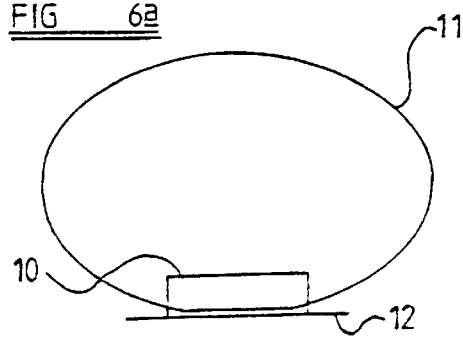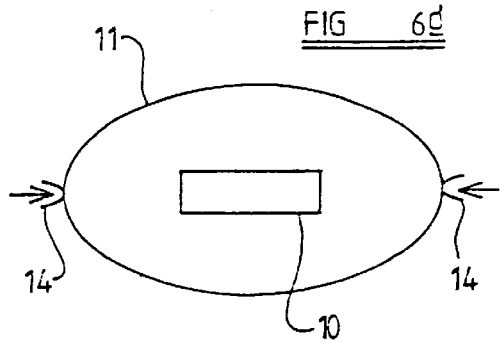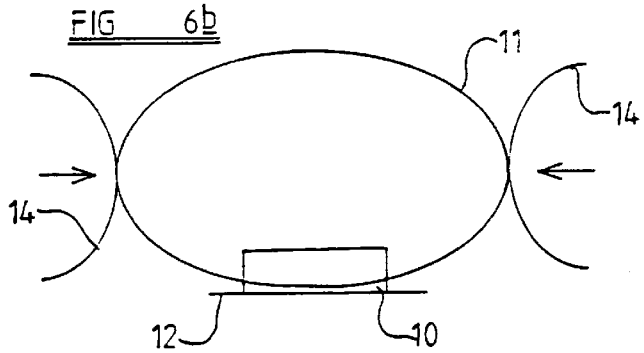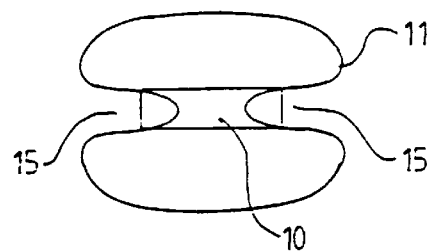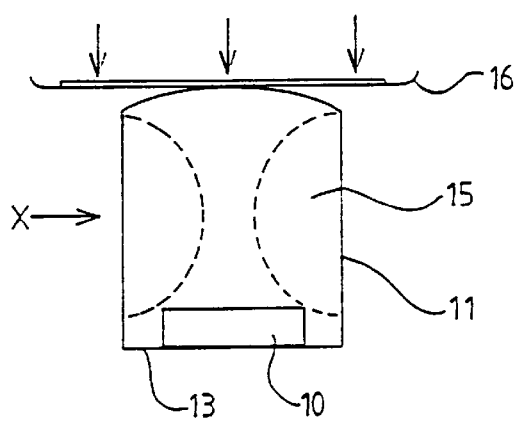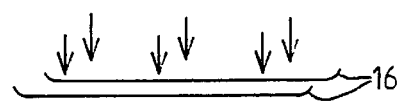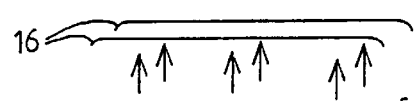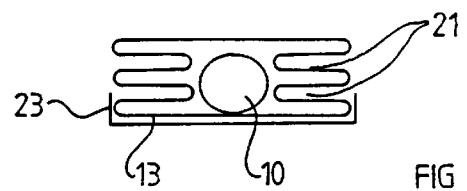

PROCESS FOR FOLDING AN AIRBAG FOR A PASSENGER RESTRAINT SYSTEM

BACKGROUND OF THE INVENTION

The invention relates to a process for folding an inflatable airbag as a constituent part of a passenger restraint system particularly in motor vehicles, which is arranged folded in a housing or similar accommodation chair when not in use and in the event of release can be automatically inflated into its form of use by introduction of a gas produced by a gas generator.

An inflatable airbag with the above features is described in German patent application 43 43 026-A1; the known airbag is folded in such a way that in the event of release the gas flowing out of the gas generator flows directly to its fold surfaces without the gas supplied by the gas generator flowing round other fold surfaces first. The published document describes the procedure when folding the airbag, which is complicated and results from the folding, and the disadvantage emerges that the packing process for an airbag folded in this way can only be carried out in an awkward manner and it cannot be ensured that the desired position of the individual fold surfaces of the folded airbag as regards the gas supplied by the gas generator flowing to them is ensured.

The object of the invention is therefor ore to provide a process for folding an airbag with the typical features that is simple to implement.

SUMMARY OF THE INVENTION

The way in which this object is achieved will emerge from Claim 1; advantageous embodiments of the invention are given in the sub-claims.

The fundamental idea of the invention provides that before the start of its folding the airbag is brought into its form of use and starting from this is folded by being acted upon by mechanical folding aids, avoiding the formation of double layers of the airbag fabric, in such a way that at least the fold surfaces of the folded airbag formed in the first folding step are arranged in one layer with respect to the gas generator in such a way that the outflowing gas acts directly on the fold surfaces of the folded airbag formed in the first folding step without first flowing round other fold surfaces. As the airbag is therefore made into its for of use before the start of the folding process, the subsequent folding can advantageously be purposefully automated, wherein a high reproducibility of the folding as well as of the inflation is guaranteed at the same time because the fold surfaces are brought into their folded position starting from the inflated state of the airbag.

Furthermore, although in principle it is known from U.S. Pat. No. 5,300,011 and 5,360,387 partially to inflate an airbag in the course of the folding process and then to empty the airbag again for subsequent folding processes, overall this makes the folding process more complicated to implement and no connection can be made between the folding and the inflation of the airbag by means of a partial step of this kind.

A first embodiment of the invention provides that the base fabric surface of the airbag allocated to the gas generator remains unfolded in the region of the housing and/or the accommodation chamber and the fabric surfaces of the airbag rising upwards above it are folded in one layer in the direction of the base fabric surface this means that double layers are avoided when folding the blank, because the fabric parts rising when the airbag is inflated are folded in the direction of the base fabric surface connected to the gas generator, so that when folding is completed and in the event of release the air expelled from the airbag in the corresponding folding process is replaced by the inflowing gas without resistance and the airbag unfolds again in the sequence of its folding.

According to an embodiment the process provides that the airbag brought into its form of use is acted upon by several—corresponding to the number of desired folds—folding aids arranged perpendicular to the base fabric surface and/or to the accommodation chamber and descending from above onto the base fabric surface and is folded into folds which are parallel and standing perpendicular to the base fabric surface; in particular it can be provided that the individual folding aids are brought to act upon the airbag in a time interval starting from the internally arranged gas generator to the outside.

An alternative folding process provides that folding aids pointed at each other in each case engage on two opposite sides of the airbag and form folds in the airbag which lie parallel to its base fabric surface.

According to the extent of the airbag, provision can also be made that in a first folding step folding aids pointed at each other in each case and arranged perpendicular to the base fabric surface engage on opposite sides of the airbag and in a second folding step folding aids arranged on the fabric surface opposite the base fabric surface perpendicular to the base fabric surface engage from above and form folds which lie perpendicular to the base fabric surface; alternatively, in the second folding step also, folding aids arranged parallel to the base fabric surface can engage.

A further alternative folding process can provide that folding aids standing perpendicular to the base fabric surface of the airbag engage in radial configuration on the outer periphery of the airbag and form radial folds running in a star shape in the direction of the gas generator arranged centrally in the airbag; in this case these folds can only be formed in the lateral plane, or the entire airbag fabric rising above the base fabric surface can be included in the star-shaped folding An alternative folding process can provide that in a first folding step, a pressure is exerted from the side of the airbag opposite the gas generator via a counter-part parallel to the base fabric surface until two balloon-like parts of the airbag form laterally, that in a second folding step, folding aids engaging laterally on the balloon parts push in folds between gas generator and counter-part which run parallel to the base fabric surface and that the prefolded fabric parts projecting offset by 90 degrees in the same folding plane are acted upon by folding aids standing perpendicular to the base fabric surface and hence perpendicular folds are produced which are then pressed against each other laterally.

In principle the folding method described above can also be combined with subsequent conventional folding steps, i.e. the first folding step or steps begin with the form of use of the airbag and the concluding folding steps take place after the partially folded airbag has been evacuated.

Insofar as the air required to produce the form of use of the airbag is pressed out of the airbag again in the folding process, an embodiment of the invention provides that this air can be allowed to flow out via the outlet valves arranged in the airbag in any case because of function; provision can, however, additionally and/or alternatively be made deliberately to evacuate the airbag at certain times in the entire process sequence in the folding of the airbag and to this extent carry out the remaining folding steps with fabric surfaces that are partially folded but otherwise superimposed.

When fabrics with a defined air permeability are used, the air in the airbag can, however, also escape directly through the fabric and/or normal leakage points due to the mode of assembly.

In order to bring the airbag into its form of use before the folding process begins, according to embodiments of the invention, either the airbag can be inflated before folding begins or the airbag is brought into its form of use by means of a suction device engaging on the parts of its blank.

Finally, struts, iris diaphragms, rings or cords can be used as mechanical folding aids in per se known manner.

BRIEF DESCRIPTION OF THE DRAWINGS

Embodiments of the invention which are described below are shown in the drawings, which are as follows:

FIGS. 2a–c show a folding process for an oblong airbag and oblong gas generator corresponding to the view in FIGS. 1a to 1c, FIGS. 3a–d show a further embodiment for a folding process with horizontal struts FIGS. 6a–g show a further embodiment of the folding process with vertical and horizontal struts, FIGS. 7a, b show a further embodiment of the folding process with vertical struts arranged in a star shape, FIGS. 8a, b show a further embodiment of the folding process with struts arranged differently.

DESCRIPTION OF THE PREFERRED EMBODIMENTS

Figure 1A:
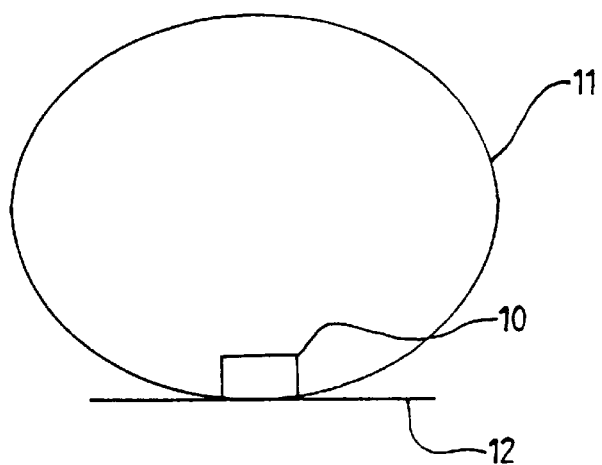
FIG. 1a shows an inflated round airbag with round gas generator before folding begins.
Figure 1B:
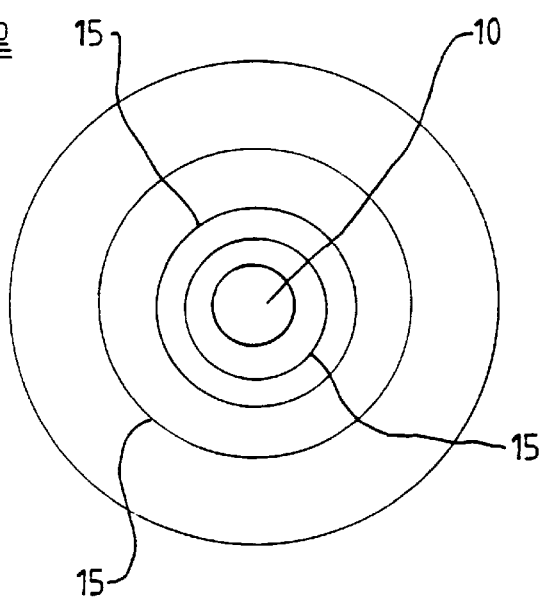
FIG 1b shows a top view with designation of the folding steps.
Figure 1C:
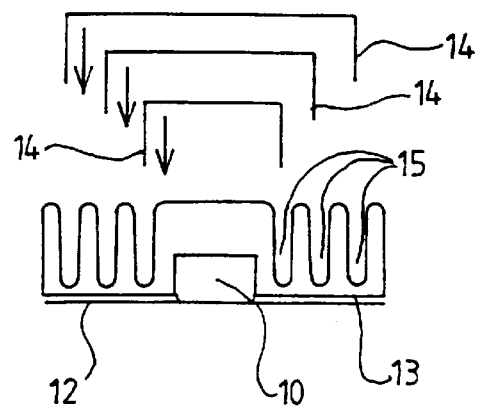
FIG. 1c shows a side view of the folding.
Figure 3A:
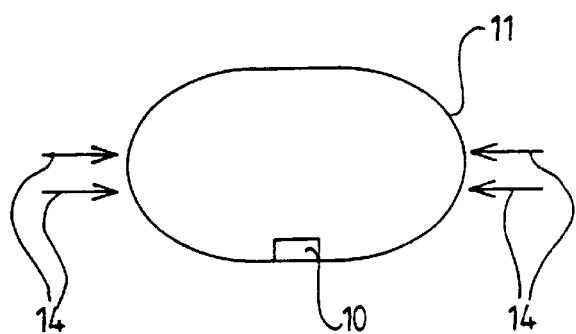
Figure 3B:
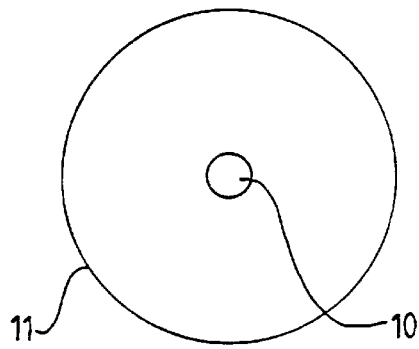
Figure 3C:
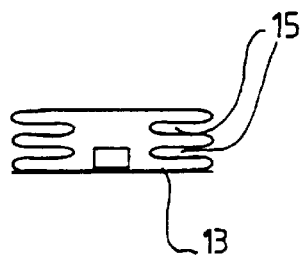
Figure 3D:
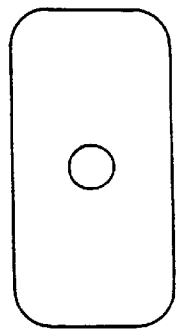

FIGS. 1a to 1c show a first embodiment for a folding process to be applied to a round airbag and/or a round housing. 10 denotes the round gas generator arranged inside the airbag fabric forming the unfolded and/or inflated airbag 11, wherein the ready-folded airbag 11 is later housed in a pot-shaped housing with upright side walls. A base fabric surface 13 of the airbag 11 is arranged on a work platform 12, and the fabric surfaces of the airbag 11 rising above this base fabric surface 13 are folded in by means of indicated mechanical circular folding aids 14. In the embodiment shown these mechanical folding aids 14 are formed by struts which are U-shaped and arranged peripherally, wherein these struts are lowered from above onto the unfolded and/or inflated airbag 11 and thus fold three folds 15 in the fabric; 1, 2 and 3 indicate the time sequence in which the folding aids 14 act upon the airbag 11. After the circular-shaped folding the airbag is brought to its final pack volume by means of lateral pressure and is then packed into a round housing.

The embodiment shown in FIG. 2 shows a corresponding folding process for an oblong airbag 11 with an along gas generator, and it will be seen from this embodiment that the corresponding folding process can be applied regardless of the shape of the airbag 11.

In the embodiment shown FIG. 3, an airbag 11, which is round in form in this respect, with a round gas generator 10 is acted upon by two—corresponding to the number of desired folds 15—folding aids 14 which engage an the two opposite sides of the airbag 11 and are posted at each other in each case, whereby folds 15 are formed in the airbag 11 which lie parallel to its base fabric surface 13; by means of pressure on the surface of the folded airbag its folded volume is then reduced by expressing the air; the pack dimensions are reduced by further folding steps, such as zig-zag folding or rolling, so that a housing can be placed over the folded airbag. Iris diaphragms can be used as folding aids as au alternative to the horizontal folding steps.

Figure 4A:
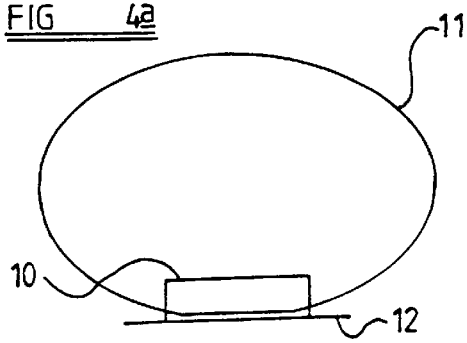
FIGS. 4a–g show a further embodiment for a folding process with vertical struts.
Figure 4D:
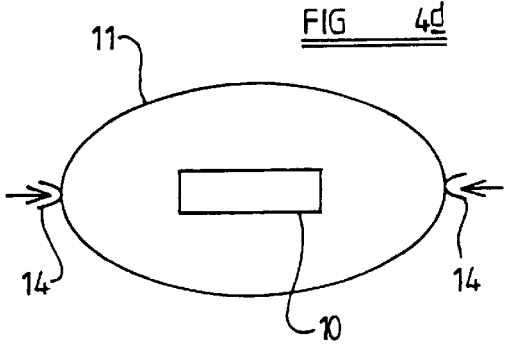
Figure 4B:
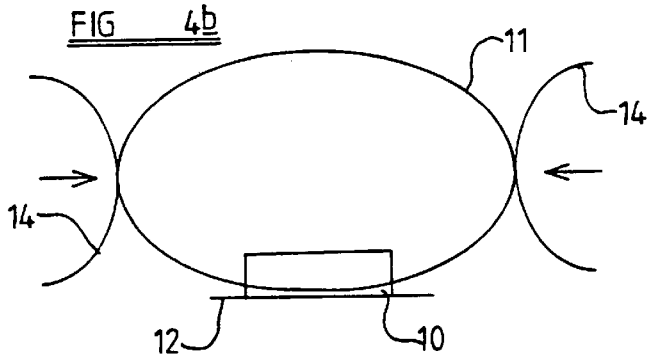
Figure 4E:
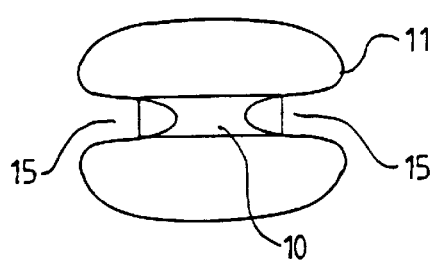
Figure 4C:
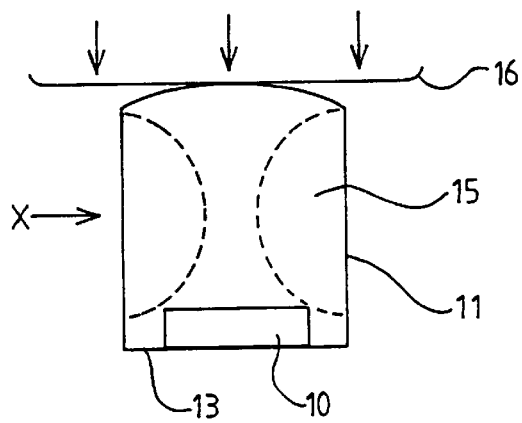
Figure 4F:
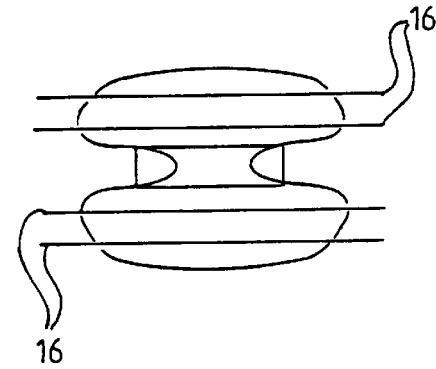
Figure 4G:
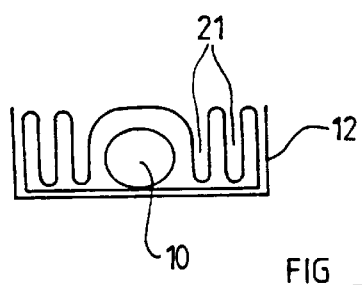
Figure 5A:
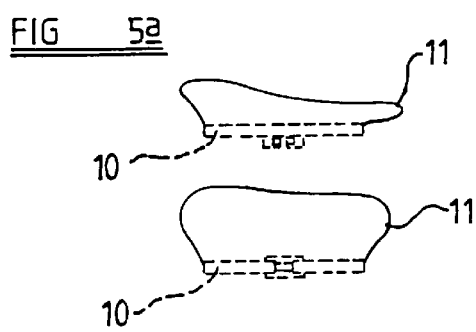
FIGS. 5a–g show a further embodiment of the folding process according to FIG. 4 with horizontal and vertical struts.
Figure 5B:
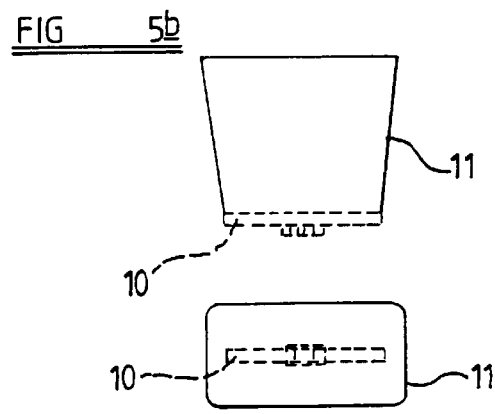
Figure 5C:
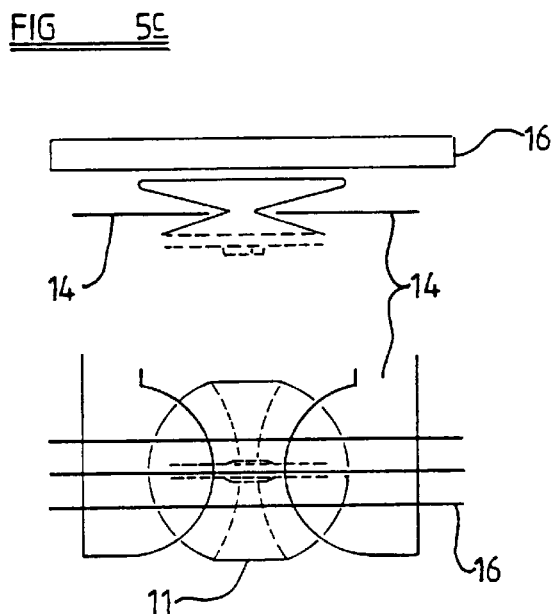
Figure 5D:
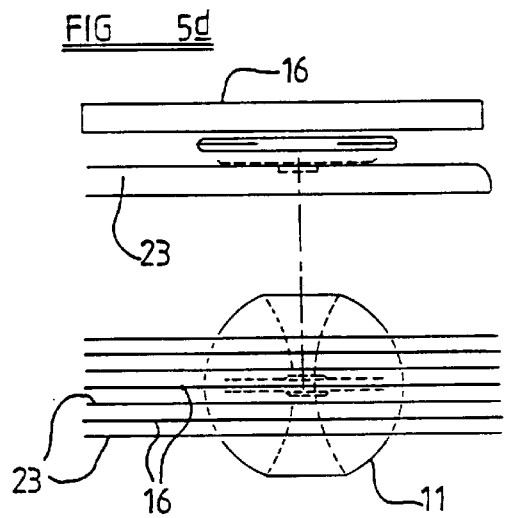
Figure 5E:
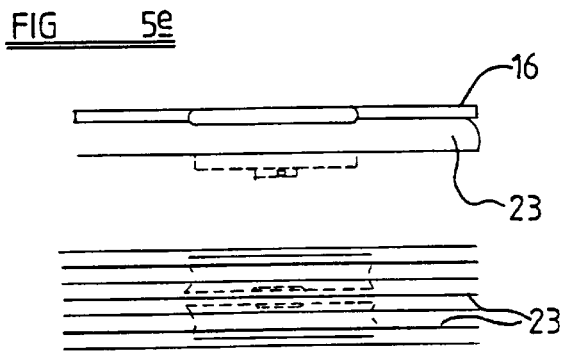
Figure 5F:
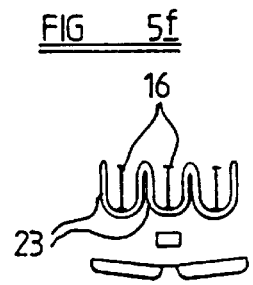
Figure 5G:
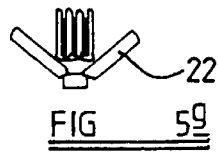

A folding process that is comparable with the folding process shown in FIG. 3 is shown in FIGS. 4a to 4g, wherein in a first folding step, a folding aid 14 standing perpendicular to the base fabric surface 13 in each case engages on two opposite sides of the airbag 11 and to this extent forms a corresponding fold 15, and wherein in a second folding step, folding aids 16 arranged perpendicular to the base fabric surface engage from above and by descending form folds 21 which lie perpendicular to the base fabric surface 13 in this respect. FIGS. 4a to 4c each show a side view of the airbag in the course of the folding process whereas FIGS. 4d to 4f show the associated views from above. FIG. 4g shows a side view from X, wherein the ready-folded airbag is packed in a housing 22.

the folding process shown in FIGS. 5a to 5g corresponds to that according to FIGS. 4a to 4g, wherein the folding steps are now shown in an associated side view and/or top view in the sequence of FIGS. 5a to 5f. FIG. 5a thus shows the starting position, whereas FIG. 5b shows the bringing of the airbag 11 into is form of use, by inflating, for example. In the process step shown in FIG. 5c, the folding aids 14 designated by numerals 1, 2 are pressed from the opposite sides of the airbag 11 at the same time as the further folding aids 16 designated by numerals 3, 4, 5 are pressed from above into the airbag 11. In the process step according to FIG. 5d, the folding aids 14 designated by the numerals 1, 2 are removed from the airbag 11, and the airbag 11 is now actively evacuated in this position. As can be seen from FIG. 5e, further folding aids 23 with the numerals 6, 7, 8, 9 now n against the airbag 11 from below parallel to the folding aids 16 (numerals 3, 4, 5) so as to produce the folded position shown in FIG. 5g in which the indicated housing 22 can be closed rood the folded airbag.

FIGS 6a to 6g show a folding process comparable with that shown in FIG. 4, wherein in this case only the direction of the engagement of the folding aids 16 is changed in the second folding step; the folding aids 16 no longer engage on the airbag 11 from above, but laterally, so that the result is the folded position shown in FIG. 6g which coincides in principle with the folded position according to FIG. 4g apart from the direction of folding.

Figure 7A:
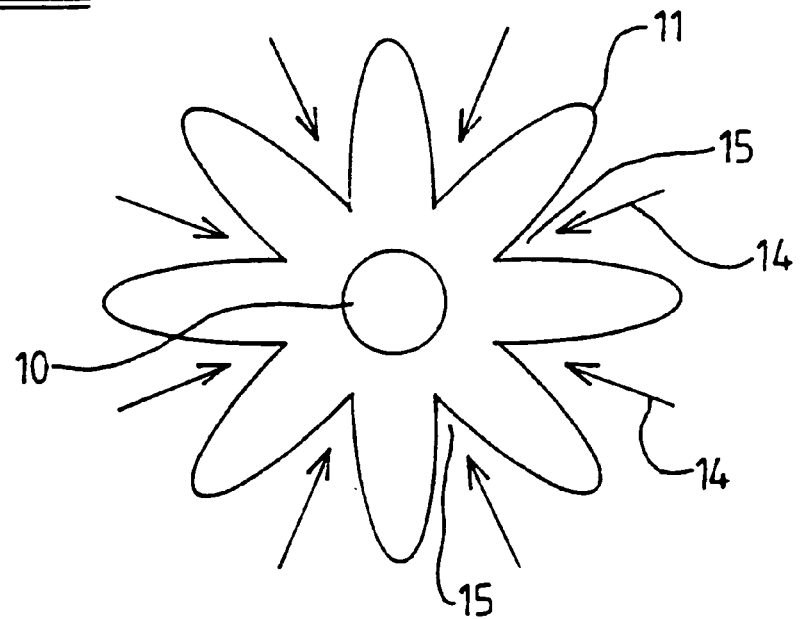
Figure 7B:
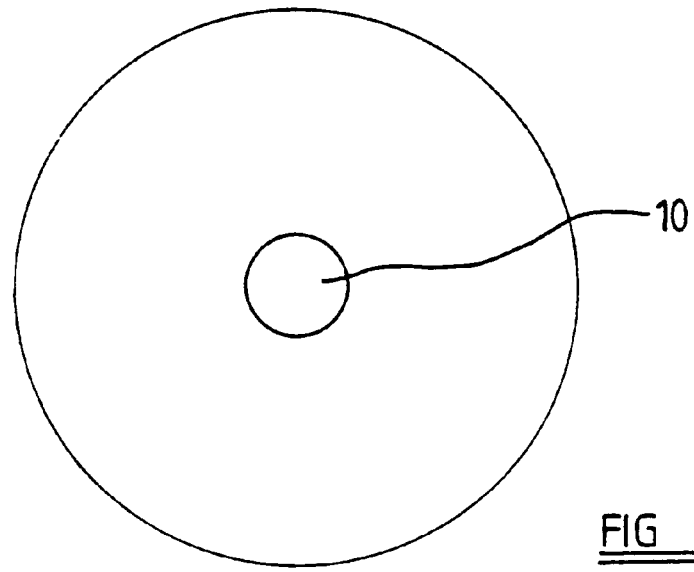
Figure 8A:
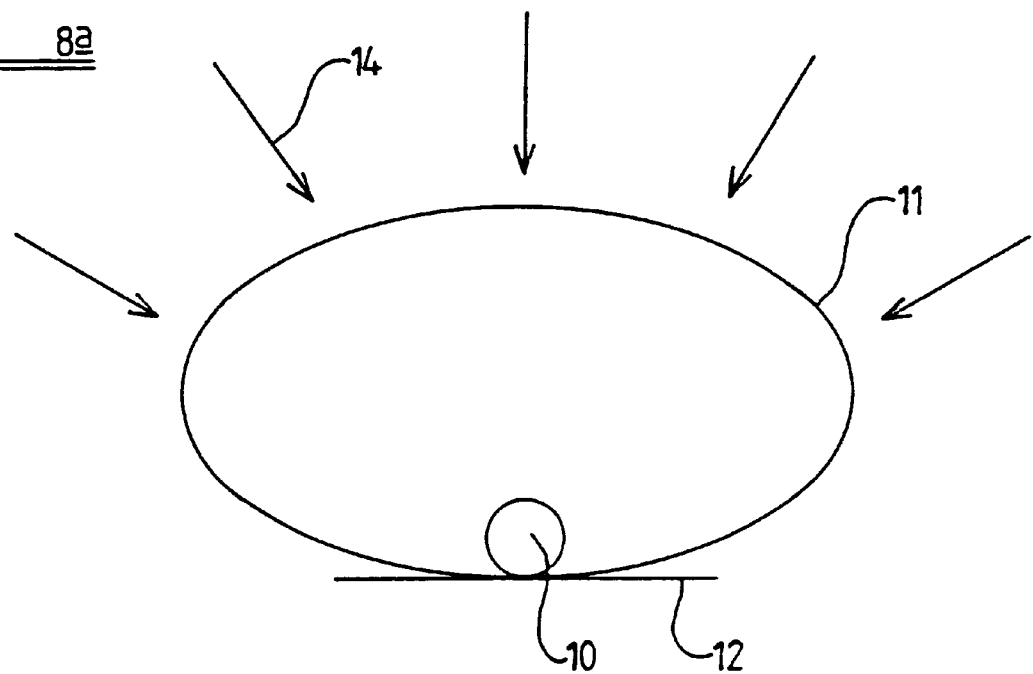
Figure 8B:
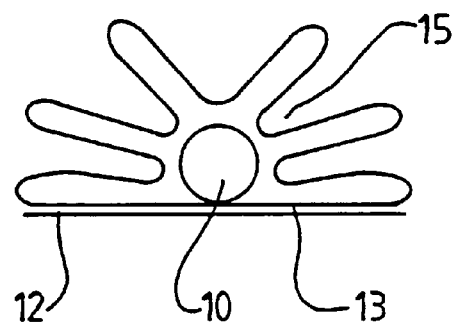

FIGS. 7a, b show a folding process in which folding aids 14 arranged in a star shape round the outer periphery of the airbag 11 are pressed into the airbag 11 in the direction of the centre point of the airbag 11 and/or the gas generator 10 arranged there, so that a corresponding folding with radial folds 15 arranged in a star shape is produced. A corresponding alternative is shown in FIGS. 8a, b, in which a comparable arrangement of folding aids 14 extends over the entire surface of the airbag 11. The evacuated airbag is readypacked by means of further conventional packing steps which are not described here.

Figure 9A:
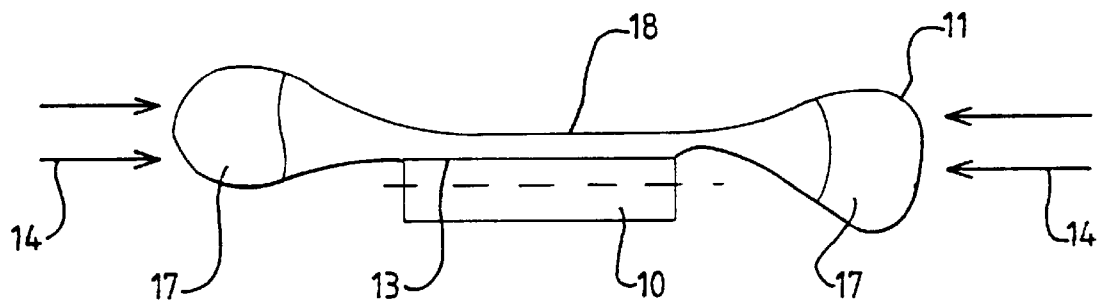
FIGS. 9a–d show a further embodiment of the folding process with horizontal and two sets of vertical struts.
Figure 9B:
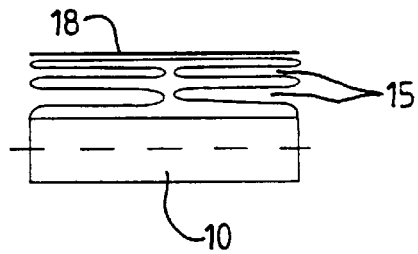
Figure 9C:
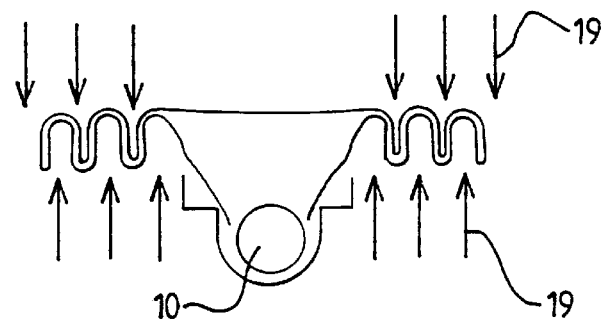
Figure 9D:
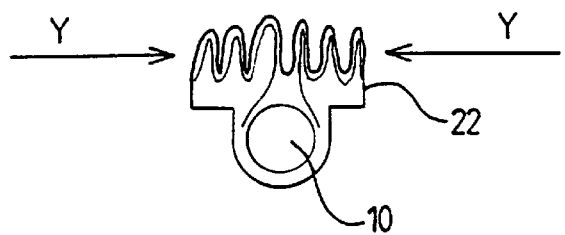

Finally, FIGS. 9a to 9d show a combination of the folding process according to the invention with a zig-zag folding according to the prior art; according to the first process step shown in FIG. 9a, a pressure is exerted on the inflated airbag 11 via a counter-part 18 parallel to the base fabric surface 13 in the direction of the gas generator 10, which pressure causes a balloon-like part 17 of the airbag 11 to form on both sides of the gas generator and/or counter-part; in a second folding step, folding aids 14 lying parallel to the base fabric surface 13 are now introduced into the airbag in the opposite direction, so that parallel folds 15 lying between the gas generator 10 and the counter-part 18 are formed; in the plane offset by 90 degrees, after evacuation of the airbag 11 there remain only airbag fabrics, which are brought into a zig-zag folding by means of opposed introduction of struts indicated with arrows 19, after which the zig-zag folds are pressed against each other laterally in the Y-direction and are surrounded by the housing 22.

The features of the subject matter of this document which are disclosed in the above description, the claims, the abstract and the drawing can be essential to the achievement of the invention in its different embodiments both individually and in any combination thereof.

What is claimed is:

1. A method for packing an inflatable airbag of a passenger restraint system of a motor vehicle into a housing, said airbag including a fabric envelope stored in a housing when not in use and automatically inflated by a gas generator into a form of use when activated, said method comprising the steps of:

bringing the airbag into the form of use;

contacting the airbag in the form of use by mechanical folding aids and pushing the mechanical folding aids into the airbag;

forming at least one first fold arranged in a single fabric layer on the gas generator so that gas, produced by the gas generator for inflating the airbag when activated, directly impacts on the single fabric layer of the at least one first fold without flowing along other fold surfaces.

2. A method according to claim 1, further including the steps of:

leaving a base fabric surface of the fabric envelope unfolded in the area of a base platform of the housing where the gas generator is located;

folding the fabric envelope extending upwardly from the base platform of the housing in a single fabric layer toward the base fabric surface.

3. A method according to claim 2, wherein said step of contacting and pushing includes arranging and moving a number of folding aids, corresponding to a number of folds desired, parallel to the base fabric surface in order to produce folds parallel to the base fabric surface.

4. A method according to claim 2, wherein said step of contacting and pushing includes arranging and moving a number of folding aids, corresponding to a number of folds desired, perpendicular to the base fabric surface in order to produce folds perpendicular to the base fabric surface.

5. A method according to claim 2, wherein said step of contacting and pushing includes arranging and moving a number of folding aids, corresponding to a number of folds desired, perpendicular to the base fabric surface in order to produce folds perpendicular to the base fabric surface and further includes arranging and moving a number of folding aids, corresponding to a number of folds desired, parallel to the base fabric surface in order to produce folds parallel to the base fabric surface.

6. A method according to claim 2, wherein said step of pushing includes moving the folding aids in a time delay sequence starting with the folding aid closest to the gas generator and ending with the folding aid closest to a housing wall.

7. A method according to claim 2, wherein said step of pushing includes arranging a number of folding aids, corresponding to a number of folds desired, parallel to the base fabric surface on opposed ends of the airbag and moving the folding aids toward one another in order to produce folds parallel to the base fabric surface.

8. A method according to claim 2, wherein said step of contacting and pushing includes:

arranging first ones of the folding aids perpendicularly to the base fabric surface at opposed ends of the airbag and arranging second ones of the folding aids perpendicularly to the base fabric surface opposite the base fabric surface;

moving the first folding aids toward one another to form folds perpendicular to the base fabric surface; and, subsequently, moving the second folding aids toward the base fabric surface to form folds perpendicular to the base fabric surface.

9. A method according to claim 2, wherein said step of contacting and pushing includes:

arranging first ones of the folding aids perpendicularly to the base fabric surface at first opposed ends of the airbag;

arranging second ones of the folding aids parallel to the base fabric surface at second opposed ends of the airbag;

moving the first folding aids toward one another to form folds perpendicular to the base fabric surface; and, subsequently, moving the second folding aids toward one another to form folds parallel to the base fabric surface.

10. A method according to claim 2, wherein said step of contacting and pushing includes:

arranging the folding aids perpendicularly to the base fabric surface and radially to a center of the base fabric surface; and moving the folding aids radially toward one another to form radial folds extending perpendicular to the base fabric surface.

11. A method according to claim 2, wherein said step of contacting and pushing includes:

arranging the folding aids radially about the surface of the air bag; and moving the folding aids radially inwardly to form radial folds.

12. A method according to claim 2, wherein said step of contacting and folding includes firstly moving a counter-part, extending parallel to the base fabric surface, from above toward the base fabric surface to divide the airbag into two balloon parts, secondly laterally moving the folding aids, extending parallel to the base fabric surface, onto the two balloon parts to form folds parallel to the base fabric surface, thirdly evacuating the air bag, and lastly moving struts, positioned perpendicularly to the base fabric surface, onto the fabric parts for producing and pressing against one another perpendicular zigzag folds.

13. A method according to claim 1, further including the steps of evacuating the air bag before enclosing the airbag in the housing.

14. A method according to claim 1, wherein the step of contacting and pushing includes expelling air, displaced by the folding aids, from the air bag via outlet valves.

15. A method according to claim 1, wherein the step of contacting and pushing includes evacuating the air bag between individual folding steps.

16. A method according to claim 1, wherein the step of bringing the air bag into the form of use includes inflating the air bag.

17. A method according to claim 1, wherein the step of bringing the air bag into the form of use includes applying suction to the exterior of the air bag.

18. A method according to claim 1, wherein the folding aids are struts, iris diaphragms, rings, or cords.

* * * * *